United States Patent [19]

Ricciardi

[11] Patent Number: 5,484,153
[45] Date of Patent: Jan. 16, 1996

[54] MOTORCYCLE KICKSTAND ACCESSORY

[76] Inventor: Robert Ricciardi, 170 Oceanside St., Islip Terrace, N.Y. 11752

[21] Appl. No.: 334,573

[22] Filed: Nov. 7, 1994

[51] Int. Cl.⁶ .................................................. B62H 1/02
[52] U.S. Cl. ........................................ 280/293; 248/346.5
[58] Field of Search ...................... 280/293; 248/346.1, 248/188.8, 188.9, 346, 347

[56] References Cited

U.S. PATENT DOCUMENTS

| | | | |
|---|---|---|---|
| 4,474,387 | 10/1984 | Maranell et al. | 280/293 |
| 4,768,800 | 9/1988 | Johns | 280/293 |
| 4,819,957 | 4/1989 | Printy | 280/293 |
| 5,358,265 | 10/1994 | Yaple | 280/293 |

Primary Examiner—Mitchell J. Hill

[57] ABSTRACT

For obviating marring of a soft surface, a flat plate of metal construction material held by the weight in an interposed position over the soft surface and beneath a leg of a kickstand of a parked motorcycle against the urgency of a return spring, such that when released from the interposed position as when the kickstand leg is raised, the plate assumes a non-use storage position and the spring urgency obviates what would be an unacceptable rattling noise as might otherwise be caused by the typical bumpy travel of the motorcycle.

1 Claim, 1 Drawing Sheet

MOTORCYCLE KICKSTAND ACCESSORY

The present invention relates to improvements for a weight-bearing plate for a motorcycle kickstand of a type used to obviate surface marring of soft terrain or the like by the kickstand leg under the typically heavy weight of the motorcycle, the improvements more particularly contributing to the convenience in the use of the reference plate for the purposes intended.

EXAMPLE OF THE PRIOR ART

Closely related, but significantly specifically different, as will be subsequently explained, to the within inventive motorcycle kickstand accessory is the "Soft Terrain Motorcycle Support Fixture" of U.S. Pat. No. 4,625,987 issued to Barry I. Marsh on Dec. 2, 1986, the Marsh '987 patent referencing U.S. Pat. Nos. 4,521,031 to Huth, 4,474,387 to Maranell et al., 3,955,829 to Bussler, 3,970,330 to Norcross, 3,712,640 to Shipman et al., and 3,998,470 to Houston.

The patented device of the Marsh '987 patent contemplates use of a weight-bearing plate for positioning beneath the motorcycle kickstand leg to obviate the surface impression or other marring that otherwise would be caused by the weight of motorcycle in a soft terrain, which would include the macadam surface of a restaurant parking lot. Also provided is a steel chain extending from the weight-bearing plate to be used for attachment to the motorcycle, the attachment of choice of Marsh being a padlock 38.

A significant shortcoming of the noted prior art and specifically that of the patented Marsh device, and which broadly it is an object of the present invention to overcome, is to eliminate the inconvenience in the use of a padlock or a mechanically equivalent locking device for attachment of the weight-bearing plate to the motorcycle.

More particularly, it is an object to achieve a chain attachment between the weight-bearing plate and the motorcycle and avoid rattling-type noise of the attaching chain during typical bumpy movement of the motorcycle during use, which noise to a typical biker would be unacceptable.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
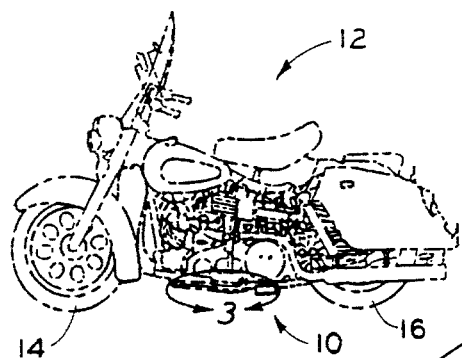
FIG. 1 is a front elevational view of a motorcycle in phantom perspective, having in supported relation thereon the within inventive kickstand accessory in full line perspective.
Figure 2:
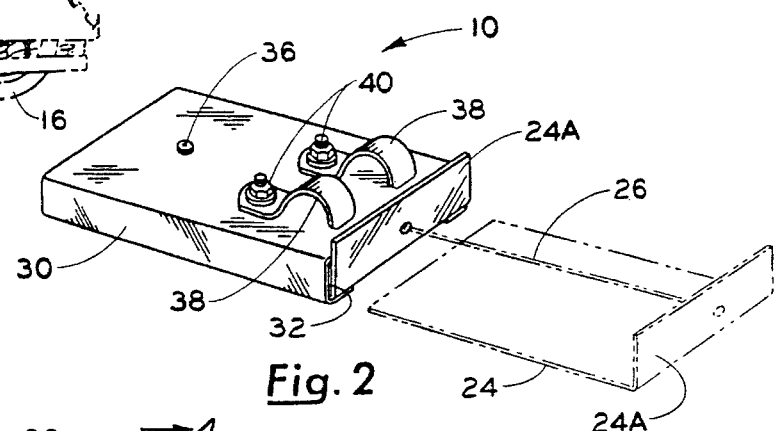
FIG. 2 is an isolated perspective view of the kickstand accessory with the non-use and use positions of the support plate thereof respectively illustrated in full line and phantom perspective.
Figure 3:
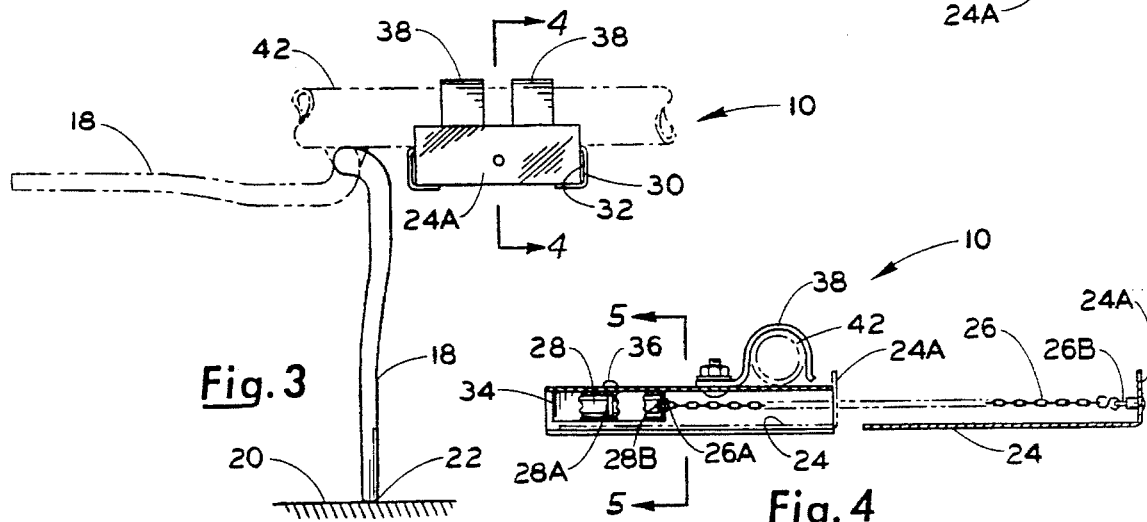
FIG. 3 is a detailed front elevational view of the structure denoted by reference arrow 3 of FIG. 1.
Figure 4:
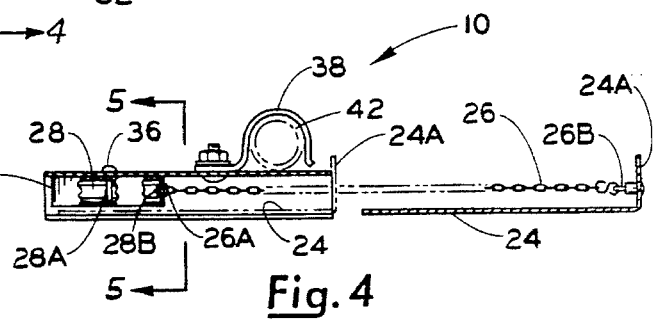
FIG. 4 is a sectional view taken along line 4—4 of FIG. 3.
Figure 5:
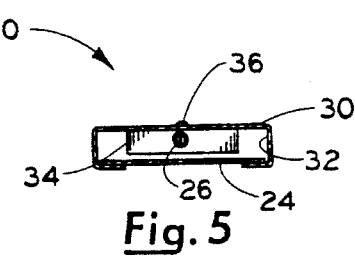
FIG. 5 is another sectional view taken along line 5—5 of FIG. 4.

The within inventive kickstand accessory, is generally designated 10 in FIG. 1, and as is also shown in this figure is intended for use with a motorcycle 12 having front and rear wheels 14 and 16 between which is positioned the kickstand 10 of a known type having, as best shown in FIG. 3, a downwardly pivotally traversing leg 18 which, in conjunction with the wheels 12 and 14, cooperates to define, as well understood, a tripod support during non-use of the motorcycle 12, as when the motorcycle 12 is parked on a macadam or other support surface 20 of a restaurant customer parking lot or the like.

In the condition depicted in FIG. 3, the weight of the inclined motorcycle 12 that is brought to bear via the kickstand leg 18 against the parking lot surface 20 at the weight concentration point 22 often mars the surface with an unsightly impression or indentation.

Figure 6:
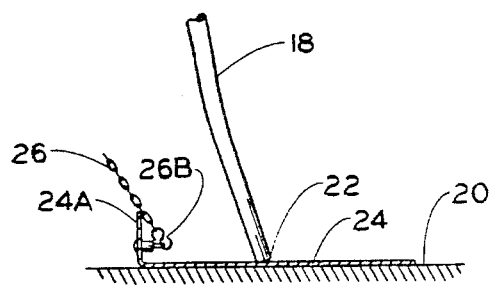
FIG. 6 is a partial view illustrating the use position of the support plate of the kickstand accessory.

Surface marring is obviated according to the present invention using, as best illustrated in FIG. 6, a flat plate 24 of selected metal construction material to support the motorcycle weight while retaining its flat configuration, said plate 24 having the FIG. 6 illustrated interposed position between the free end of the kickstand leg 18 and the surface 20 being protected against defacement.

Underlying the present invention is the recognition that the simple solution of using an interposed weight-supporting plate, which is the practice in the prior art, is often frustrated by unintended oversight of the biker leaving behind the support plate 24 when leaving the parking lot. Attaching the support plate 24 to the motorcycle 12 has heretofore not been an acceptable solution because any attaching structure, such as a chain such as is used herein and denoted by the reference numeral 26, must be accorded sufficient payout to extend from a storage position to the use site 22, and managing this length of chain has not been achieved in a totally satisfactory manner in the prior art. The chain length and the rattling noise that it generates during the often bumpy movement of the motorcycle during riding use thereof have been the major unsolved prior art shortcomings.

According to the present invention, any unwieldiness presented by the chain length and any possibility of rattling noise being caused thereby are simultaneously eliminated by controlling the payout and windup of the chain 26 under the urgency of a spring 28 wherein the chain payout loads the spring and, upon release, the spring urgency causes the windup of the chain and, most important, maintains the helically wound chain under spring urgency which in practice has been found to obviate chain movement that results in rattling noise. The motorcycle weight maintains the plate 24 in its FIG. 6 use position, being a much greater force than the urgency of the return spring 28.

A preferred embodiment of the within kickstand accessory 10 includes a housing 30 bounding a storage compartment 32 for spring 28, itself disposed in a housing 54 screwed at 36 to the main housing 30. Spring 28 will be understood to be a negator spring of the type illustrated and described in the Sealfon U.S. Pat. No. 5,261,882 issued on Nov. 16, 1993 which, as is well understood, has an inner end 28A fixed against movement and an outer end 28B that is urged by a pulling force through windup movement against the resistance of the helical configuration of the negator spring. Upon release of the pulling force, the helical configuration restores itself and, as is well understood, produces a constant force or spring urgency which, in turn, produces a helical wrap of the chain 26 in encircling relation about the spring 28. Chain 26 is connected at its opposite ends, as at 26A and 26B in spanning relation respectively between the spring end 28A and a gripping flange 24A of the plate 24, which flange also serves as a stop limiting the return movement of plate 24 into its storage or non-use condition which contributes to maintaining the stored chain 26 under the urgency of the spring 28.

Completing the accessory 10 are two mounting elements 38 secured by nut and bolt means 40 to housing 30 by which the accessory is supported on a selected motorcycle rod 42 in the vicinity of the kickstand 10.

While the motorcycle kickstand accessory herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. For use with a motorcycle of a type having front and rear wheels and having positioned therebetween a kickstand with a downwardly pivotally traversing leg to define a tripod support provided by said front and rear wheels and said kickstand leg during non-use of said motorcycle on a support surface, an attachment to said motorcycle of a plate means having an operative position interposed between said leg and said support surface to obviate any marring of said support surface as may be due to the weight of said motorcycle transmitted by said leg, said plate means comprising a flat plate of selected metal construction material to support the weight of said motorcycle, a housing bounding a storage compartment for said plate attached to said motorcycle, a spring disposed in said housing compartment having an inner end fixed against movement and presenting an unfixed outer end, a chain connected in spanning relation between said plate and said spring outer end to permit manual removal of said plate from said housing compartment against spring urgency and the return thereof under said spring urgency, whereby in said plate operative position said weight of said motorcycle holds said plate in place and in the non-use stored condition thereof said spring urgency contributes to obviating any rattling thereof during riding use of the motorcycle.

* * * * *